(12) United States Patent
Johnson

(10) Patent No.: US 9,352,636 B1
(45) Date of Patent: May 31, 2016

(54) WRAPAROUND SCREEN FOR UTILITY VEHICLE

(71) Applicant: J. Michael Johnson, Dallas, TX (US)

(72) Inventor: J. Michael Johnson, Dallas, TX (US)

( * ) Notice: Subject to any disclaimer, the term of this patent is extended or adjusted under 35 U.S.C. 154(b) by 0 days.

(21) Appl. No.: 14/804,626

(22) Filed: Jul. 21, 2015

(51) Int. Cl.
  *B60J 1/20* (2006.01)
  *B60J 1/02* (2006.01)
  *B62J 17/00* (2006.01)

(52) U.S. Cl.
  CPC . *B60J 1/025* (2013.01); *B62J 17/00* (2013.01)

(58) Field of Classification Search
  CPC .................................. B60J 1/02; B60J 1/025
  USPC .................. 296/77.1, 84.1, 90, 96.21, 95.1;
  160/239, 269, 327, 382, DIG. 2
  See application file for complete search history.

(56) References Cited

U.S. PATENT DOCUMENTS

| | | | | |
|---|---|---|---|---|
| 2,223,477 A | * | 12/1940 | Bernier | 160/353 |
| 2,884,994 A | * | 5/1959 | Rosalsky | 160/404 |
| 3,301,589 A | * | 1/1967 | Hayden | 296/102 |
| 3,304,995 A | * | 2/1967 | Goldstein | 160/327 |
| 3,753,458 A | * | 8/1973 | Lazarek | 160/354 |
| 3,834,756 A | * | 9/1974 | Grell | 296/136.1 |
| 4,621,859 A | * | 11/1986 | Spicher | 296/77.1 |
| 4,813,706 A | | 3/1989 | Kincheloe | |
| 5,174,622 A | | 12/1992 | Gutta | |
| 5,393,118 A | * | 2/1995 | Welborn | 296/147 |
| 5,460,409 A | | 10/1995 | Conner | |
| 6,206,447 B1 | * | 3/2001 | Nation | 296/77.1 |
| 6,973,953 B2 | | 12/2005 | Winner | |
| 7,007,999 B1 | | 3/2006 | Schneller | |
| 7,147,263 B2 | | 12/2006 | Schneidau et al. | |
| 7,311,347 B1 | | 12/2007 | Aller | |
| 7,380,860 B2 | * | 6/2008 | Dolan | 296/86 |
| 7,600,554 B1 | * | 10/2009 | Wright et al. | 160/327 |
| 8,308,223 B2 | * | 11/2012 | King | 296/190.03 |
| 8,888,163 B1 | | 11/2014 | Johnson | |
| 2002/0084669 A1 | | 7/2002 | Goodstein | |
| 2009/0021051 A1 | | 1/2009 | Brown | |
| 2011/0241325 A1 | | 10/2011 | King et al. | |

* cited by examiner

*Primary Examiner* — H Gutman
(74) *Attorney, Agent, or Firm* — Law Office of Sam Sokhansanj PLLC

(57) ABSTRACT

A wraparound meshed screen for a utility vehicle is disclosed that can be mounted to a roll cage or front portion of a UTV or suitable vehicle thereby allowing air to flow through and into a cabin area of the vehicle while blocking dust, dirt, insects, and other foreign objects from entering the cabin. In particular, the utility vehicle screen includes a flexible frame and a meshed flexible screen secured to the frame. In addition, the frame can include a first flap and a second flap at each opposing side end, wherein the first and second flaps extend along the length of each side end. In addition, the first and second flaps each have elastic, stretchable, and flexible properties, such as neoprene. Further, the first and second flap can each include a closure unit extending along their side ends, wherein the closure unit is configured to secure the first flap wrapped around a first side bar of a utility vehicle and secure the second flap wrapped around a second side bar of the utility vehicle.

16 Claims, 4 Drawing Sheets

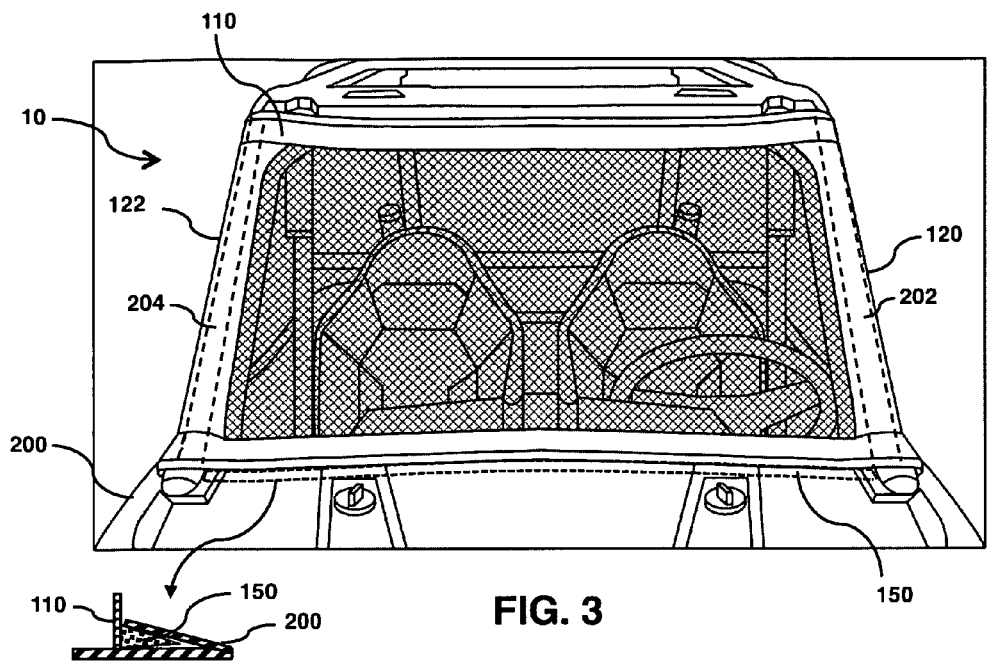
FIG. 3
FIG. 3A
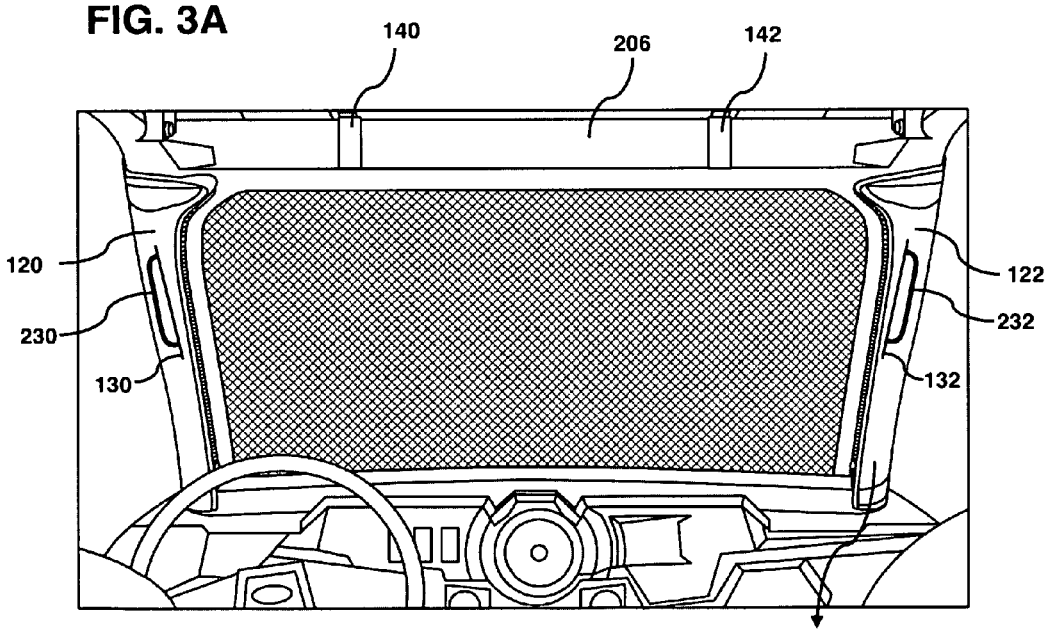
FIG. 4

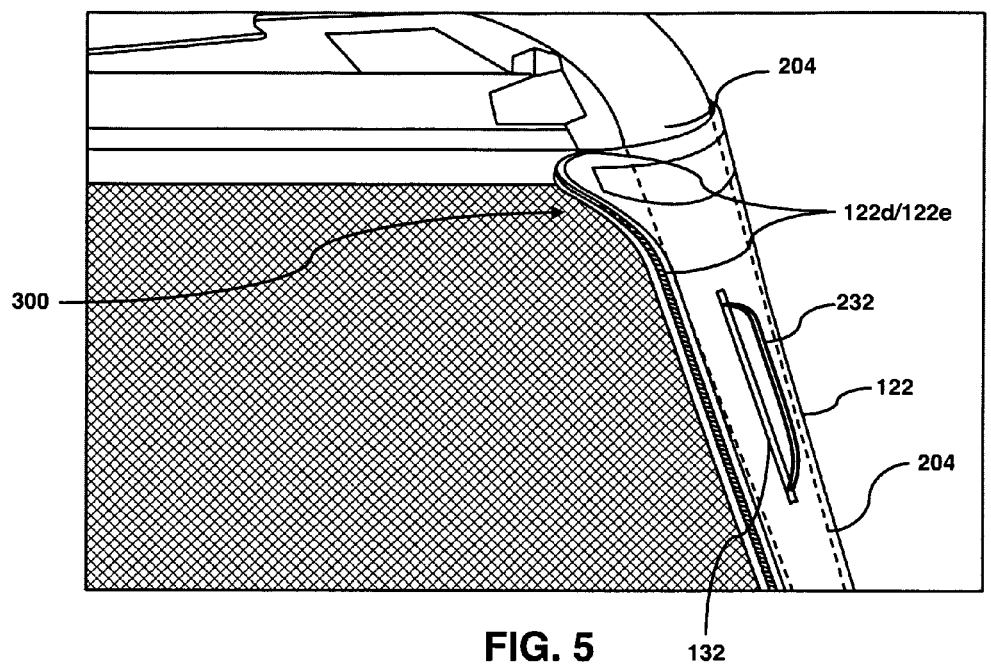
FIG. 5
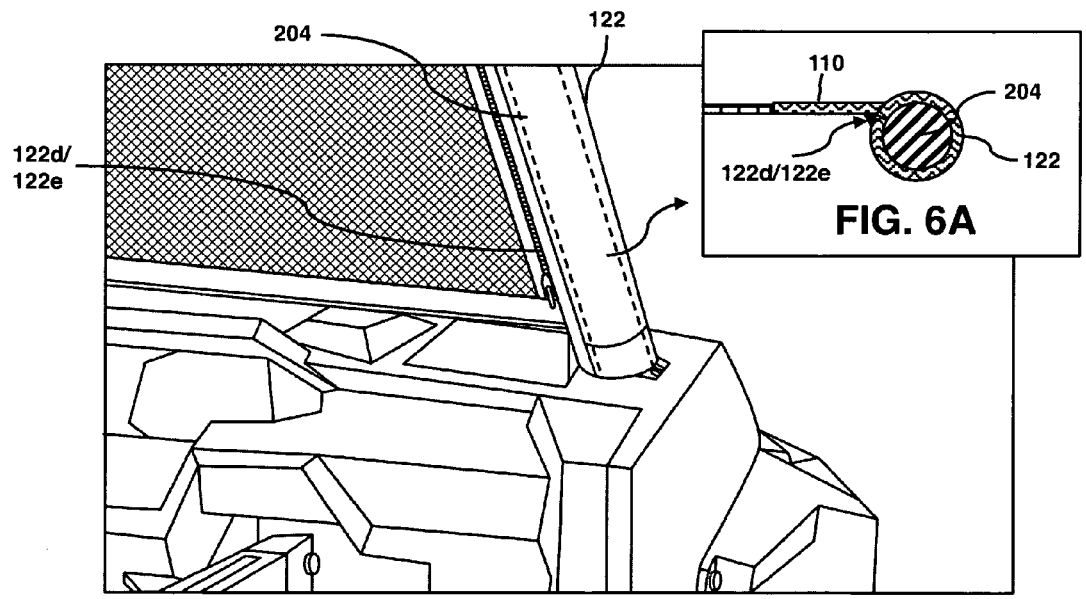
FIG. 6A
FIG. 6

WRAPAROUND SCREEN FOR UTILITY VEHICLE

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Utility vehicles (UTVs) are becoming increasingly popular for use in various settings. Generally, a UTV comprises a body, a cab area where the driver is seated, and a roll cage that surrounds the cab area. One of the problems with conventional UTVs is that they do not protect the driver and passengers from debris, such as bugs, rocks, branches, dust, dirt, etc.

Cab enclosures and lightweight transparent windshields have been developed that can be attached to a roll cage to protect the driver and passengers. These devices are typically comprised of a transparent plastic material that is non-permeable. However, these transparent devices reduce the passage of air into the cab area. Reduced airflow into the cab area, dust and debris is more prone to collect within the cab area. In addition, during warm and hot weather conditions, reduced airflow into the cab area can be uncomfortable for the driver and passengers.

While UTVs are suitable for the particular purpose to which they address, they are not as suitable for providing protection from debris to a driver while allowing airflow into the cab area. Conventional UTVs do not provide adequate protection for drivers and passengers.

U.S. Pat. No. 7,007,999 (Schneller) discloses a flexible windscreen for attaching to a front portion of a roll cage of a utility vehicle. However, a disadvantage of this windscreen is that it requires separate additional components, namely, a plurality of separate brackets to be mounted to the roll cage of the vehicle. Further, the windscreen is mounted to the brackets using separate additional fasteners, such as bolts and nuts. Hence, the Schneller patent necessitates additional components and tools for mounting the windscreen and does not provide a quick and simple way to remove and re-attach the windscreen.

In view of the above problems, what is needed is a utility vehicle screen that is easily mountable to a front portion of a UTV, easily removable and re-attachable, durable from breakage and the elements, cost effective to manufacture, simple in design, aesthetically pleasing, and can be easily folded and stored when not in use.

BRIEF SUMMARY

In one aspect of the present disclosure herein, a wraparound windscreen for a utility vehicle is disclosed that can be mounted to a roll cage or front portion of a UTV or suitable vehicle thereby allowing air to flow through and into a cabin area of the vehicle while blocking dust, dirt, insects, and other foreign objects from entering the cabin. The screen can be easily attached and removed using wraparound flaps that are integrated with the screen and can wraparound and encase the side front bars of the UTV. In addition, the screen can be made of a virtually indestructible fiberglass material. Further, the screen can be folded multiple times and easily stowed away, such as placing it inside the glove compartment, in a bag, under or behind the seat, etc. In addition, the screen of the disclosure described herein does not require additional tools or separate components in order to mount it to the UTV and provides the UTV an aesthetically desirable configuration.

In one aspect of the disclosure described herein, a utility vehicle screen is disclosed having a frame comprised of a flexible material, a meshed flexible screen secured to the frame. In addition, the frame can further include a first flap and a second flap at each opposing side end, wherein the first and second flaps extend along the length of each side end. In addition, the first and second flaps each have elastic and flexible properties. Further, the first and second flap can each include a closure unit extending along their side ends, wherein the closure unit is configured to secure the first flap wrapped around a first side bar of a utility vehicle and secure second flap wrapped around a second side bar of the utility vehicle. The closure unit can extend from the base of the first or second flap to the top of the first or second flap. Here, the first and second flaps and frame can be made of a neoprene or polychloroprene material. Further, the meshed flexible screen can be made of fiberglass. In addition, the frame can also include one or more fasteners coupled to the top of the frame, wherein the fasteners can be straps. The closure unit can be a zipper or hook and loop fastener. The frame can further include a semi-rigid lip extending along its lower end. In addition, the first or second flap can further include an elongated opening configured to allow a handle bar of the utility vehicle to slide therethough. Here, the utility vehicle can be one or more of a utility task vehicle (UTV), all terrain vehicle (ATV), recreational off highway vehicle (ROV), golf car, golf cart, motorcycle, and automobile.

In another aspect of the disclosure described herein, a utility vehicle screen is disclosed having a frame and a meshed flexible screen secured to the frame. Here, the frame includes a wraparound stretchable securement member for substantially encasing at least 50% of a side pillar of a utility vehicle, wherein the securement member further comprises a fastener along its length. Here, the fast securement member is coupled to the frame via the fastener in assembled form, and wherein the assembled form is comprised of the securement member in a tubular configuration. Here, the screen can be made of neoprene or polychloroprene material. Further, the fastener can be interlocking male and female members.

In another aspect of the disclosure described herein, a method of using or installing a utility vehicle screen is disclosed. The method can include placing a flexible frame having a meshed screen over a side pillar of a utility vehicle, wrapping an end flap of the frame around the side pillar of the utility vehicle, thereby encasing at least 25% of the side pillar, and securing the flap to the frame using a closure unit extending along the length of the flap. The method can further include wrapping a second flap of the frame around a second side pillar of the utility vehicle and securing the second flap to the frame using a second closure unit extending along the length of the second flap.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 3 illustrates a front view of the screen of the disclosure described herein attached to the utility vehicle.

FIG. 3A illustrates a close-up partial cross-sectional view of a flange or lip of the frame secured within a wedged groove opening of the utility vehicle.

FIG. 4 illustrates a rear view of the screen of the disclosure described herein attached to the utility vehicle.

FIG. 5 illustrates a close-up perspective rear view of a top area of the screen of the disclosure described herein attached to the utility vehicle.

FIG. 6 illustrates a close-up perspective rear view of a lower area of the screen of the disclosure described herein attached to the utility vehicle.

FIG. 6A illustrates a close-up partial cross sectional view of the flap of the screen in one non-limiting embodiment of the disclosure described herein wrapping around and enclosing a side bar of the UTV.

DETAILED DESCRIPTION

In the Brief Summary of the present disclosure above and in the Detailed Description of the Disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

Figure 1:
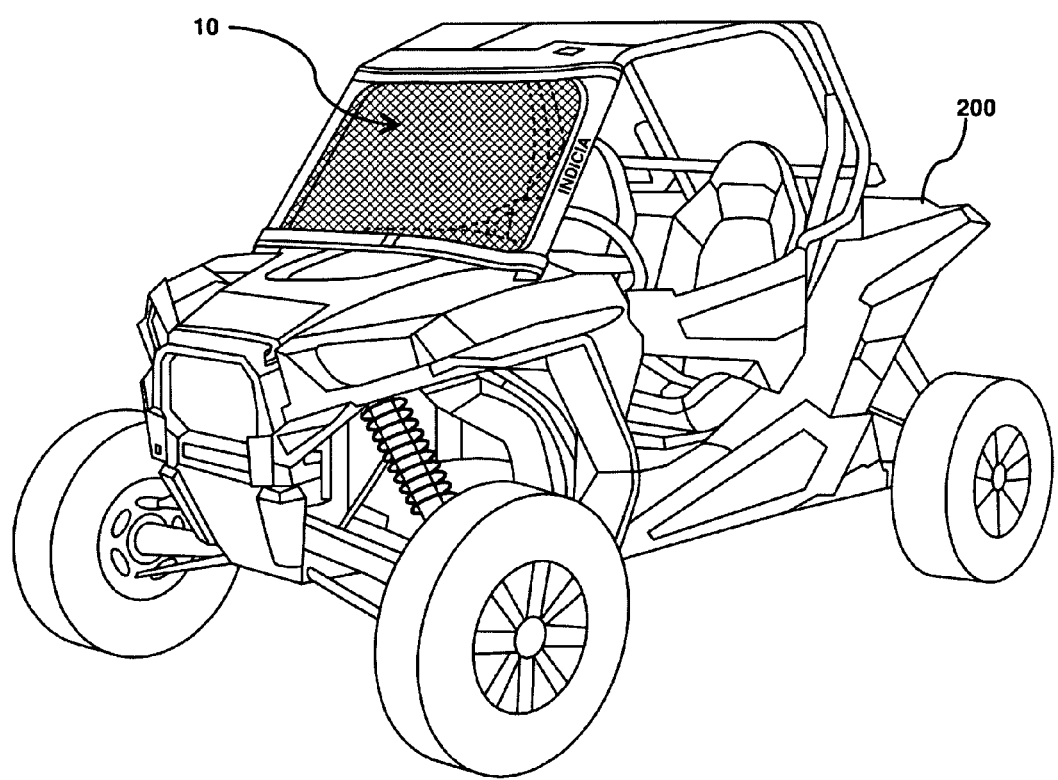
FIG. 1 illustrates a perspective view for one non-limiting embodiment of the screen of the disclosure described herein attached to a utility vehicle.

FIG. 1 illustrates one non-limiting embodiment of the windscreen or screen 10 of the disclosure described herein as mounted or assembled on a UTV 200. However, it is contemplated within the scope of the disclosure described herein that the screen of the disclosure described herein can be mounted to any type of vehicle, including but not limited to an all terrain vehicle (ATV), motorcycle, three-wheeler, golf cart, dune buggy, and the like.

Figure 2:
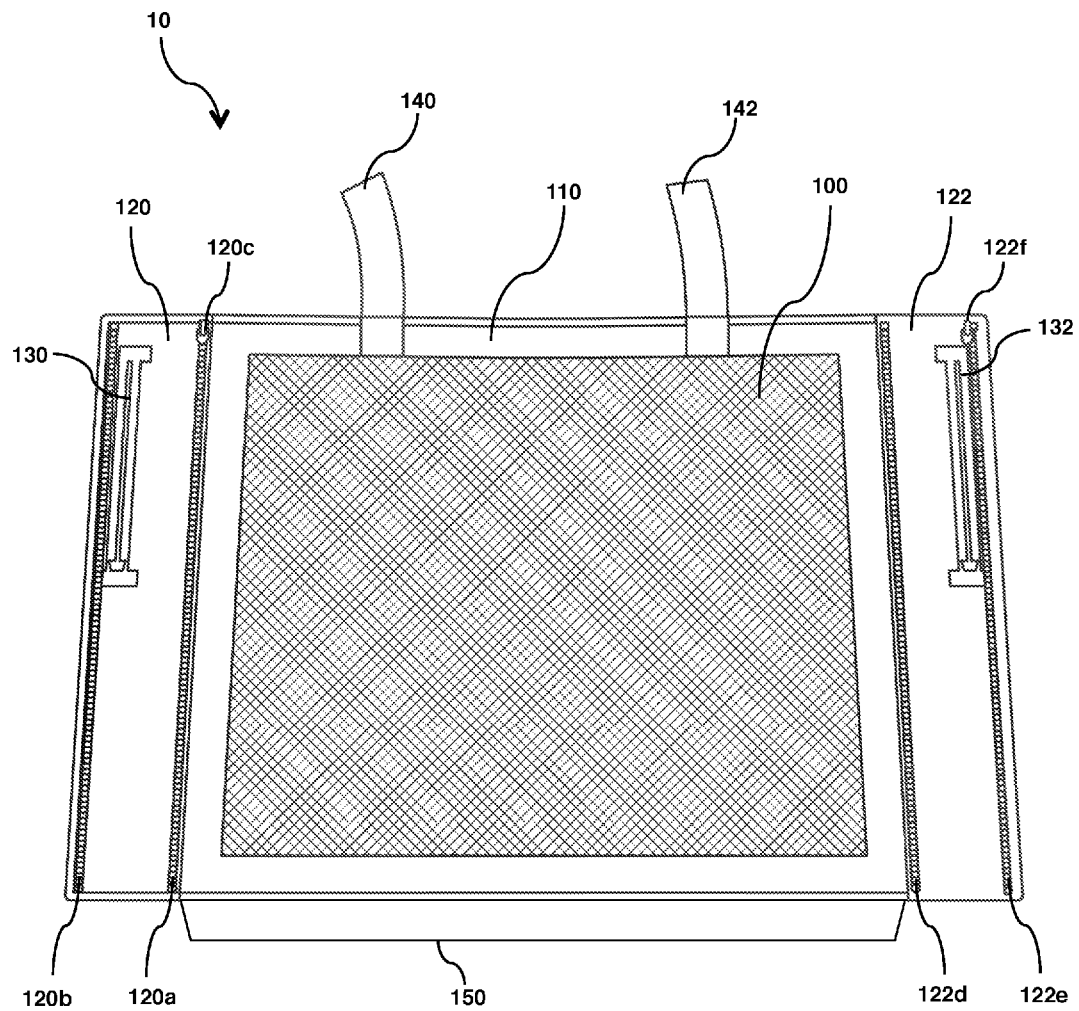
FIG. 2 illustrates an exploded rear view of the screen of the disclosure described herein.

FIG. 2 illustrates the screen of FIG. 1 in an exploded rear view of the screen 10, illustrating the opened up wraparound side flaps and straps. Here, windscreen 10 includes a meshed screen 100 securely mounted to a flexible and elastic frame or border 110. In the current embodiment, screen 100 is made of fiberglass material with a mesh count of approximately 20×20, approximately thickness of 0.011, yard diameter of 0.008-0.0085, and including up to approximately 90% light transmission, and is flame retardant, such as the mesh screen known as BetterVue® from the manufacturer Phifer®. However, it is contemplated within the scope of the disclosure described herein that screen 100 can also be elastic or rigid and include, but not limited to aluminum, various fabrics, wire mesh material, fiberglass, mesh size, light transmission ratio, color, plastic, polycarbonate, Lycra® or elastane, neoprene, cotton, polyester, and the like materials. Here, windscreen 10 can be configured to any size, shape, and configured to the size of the UTV front or A-pillar frame or vehicle specifications for which it is being mounted. In other embodiments, the windscreen of the disclosure described herein can be a universal one-size windscreen, having flexible or elastic side flaps or fasteners, thereby accommodating and/or retrofitting all or most types of UTVs or vehicles. Further, frame 110 and flaps 120 and 122 are made of stretchable, elastic, cushioned, padded, flexible, foldable material, such as neoprene, polychloroprene, polyester, rubber, Lycra® or elastane, vinyl, or cotton. However, it is contemplated within the scope of the disclosure described herein that the frame 110 and flaps 120 and 122 can be made of the same material or different materials, and can further be made of any suitable elastic, flexible, or rigid material, such as plastic, rubber, fabric, vinyl, cotton, Lycra® or elastane, metal, fiberglass, and/or polymer derived materials. In addition, flaps 120 and 122 can be separate components that are coupled or fixed to frame 110. Alternatively, flaps 120 and 122 can be integral and part of the frame 110, wherein the frame 110 and flaps 120 and 122 are one unitary piece.

Still referring to FIG. 2, frame 110 includes wrap-around flaps 120 and 122. Here, wrap-around flaps 120 and 122 can also be referred to herein as wrap-around fasteners, restraints, securement members, or straps 120 and 122. Flap 120 includes zipper fastener tape members 120a and 120b along the length of the flap that couple together via a pull-tab slider 120c. In addition, flap 120 also includes a zippered opening 130 to allow for a handle bar 230 of the UTV frame therethrough, as shown in FIG. 4. Similarly, flap 122 includes zipper fastener tape members 120d and 120e along the entire length of the flap that couple together via a pull-tab slider 120f. In addition, flap 122 also includes a zippered opening 132 to allow for a handle bar 232 of the UTV frame therethrough, as shown in FIGS. 4 and 5. However, it is contemplated within the scope of the disclosure described herein that any other fastener may also be used in addition to or lieu of zipper fasteners 120a/120b and 120d/120d, including but not limited to hook and loop (Velcro®), snaps, buckles, buttons, adhesives, and stitching, among others. In the current embodiment, flaps 120 and 122 extend along the entire side length or height of frame 110 and can entirely wrap around and completely encase or enclose exposed regions of the side bars 202 and 204 of the UTV. However, it is contemplated within the scope of the disclosure described herein that flaps 120 and 122 may also be shorter in length and at least partially extend along the side length or height of the frame, and encase or enclose from 10% up to and including 99% of the side bars of the UTV.

Still referring to FIG. 2, frame 110 can further include wraparound or looped fastener straps 140 and 142 that can wraparound a top bar 206 of the UTV 200, thereby further securing the windscreen 10 to the UTV. Frame 110 can also include a flexible semi-rigid plastic flange or lip 150 attached thereto that secures the bottom area of frame 110 to the lower or dash area of the UTV 200. More specifically, lip 150 can be placed or securely wedged within a groove or channel opening between the top dash area of the UTV and lower member or bar of the frame of the UTV, as shown in FIGS. 3 and 3A.

FIGS. 3-6A illustrate the windscreen 10 as assembled onto the A-pillar or front frame or cage of the UTV 200. More specifically, in one method of assembly, windscreen 10 is placed on and over the exterior front frame of the UTV 200. However, in other embodiments, the windscreen 10 may also be installed from within the UTV cabin. Next, flaps 120 and 122 are wrapped around the side frame or cage pillar bars 202 and 204 (also shown in broken lines) of the UTV, respectively. In addition, if the UTV or vehicle includes handle bars 230 and 232, then the handle bars 230 and 232 can be further slid through openings 130 and 132, respectively. Further, lip 150 can be securely placed or wedged within a grooved opening of the lower front frame area of the UTV, as shown in FIG. 3A and in broken lines in FIG. 3. Next, flaps 120 and 122 are further securely tightened around their respective bars 202 and 204 via their zipper fasteners 120a/120b and 120d/120e along their entire lengths, respectively. For illustrative purposes and according to one embodiment, FIG. 6A illustrates a partial close-up cross-section view of flap 122 entirely wrapping around and encasing side bar 204 of the UTV via fasteners 122d/122e. In addition, as shown in FIGS. 4 and 5, given the elasticity of flaps 120 and 122, flaps 120 and 122 can curve, shape, and wrap over and around a top area 300 or any obstruction on, around, or near top bar 206 and side bars 202 and 204 of the UTV as the flaps are fastened together.

After the windscreen 10 has been attached to or installed on the roll cage or front windshield area of the UTV or any suitable vehicle, the user may then adjust any of the straps or flaps by either loosening or tightening the straps or flaps as they see fit in order to remove any slack, ripples, or deviations on the surface of the windscreen, thereby having the windscreen 10 firmly taught and securely mounted to the UTV. For removal, screen 10 can be easily removed via unzipping the fasteners of flaps 120 and 122. In addition, screen 10 can further be folded and stowed away when not in use. In addition, it is contemplated within the scope of the disclosure described herein that the screen 10 may also be installed and coupled to a rear area of the roll cage, such as operating as a rear window. In addition, screen 10 may also include any type of indicia, advertising, or branding thereon, such as on flaps 120 or 122, as shown in FIG. 1.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the disclosure described herein is not limited to the specific forms or arrangement of parts or method of assembly described herein, except insofar as such limitations are included in the following claims. Further, it will be understood that certain features and sub-combinations are of utility and may be employed without reference to other features and sub-combinations.

What is claimed is:

1. A utility vehicle screen, comprising:
   a frame comprised of a flexible material;
   a meshed flexible screen coupled to the frame;
   the frame further comprising a first flap at a first side of the frame and a second flap at a second side of the frame, wherein the second side of the frame opposes the first side of the frame, wherein the first flap extends along the length of the first side of the frame and the second flap extends along the length of the second side of the frame;
   the first and second flaps each having elastic and flexible properties;
   the first and second flaps each having a closure unit extending along their lengths, wherein the closure unit is configured to secure the first flap wrapped around a first side bar of a utility vehicle and secure the second flap wrapped around a second side bar of the utility vehicle.

2. The utility vehicle screen of claim 1, wherein the first and second flaps are made of neoprene or polychloroprene material.

3. The utility vehicle screen of claim 2, wherein the frame is made of neoprene or polychloroprene material.

4. The utility vehicle screen of claim 1, wherein the meshed flexible screen is made of fiberglass.

5. The utility vehicle screen of claim 1, further comprises one or more fasteners coupled to top of the frame.

6. The utility vehicle screen of claim 5, wherein the fasteners are comprised of straps.

7. The utility vehicle screen of claim 1, wherein the closure unit is comprised of a zipper.

8. The utility vehicle screen of claim 1, wherein the frame further comprises a semi-rigid lip extending along its lower end.

9. The utility vehicle screen of claim 1, wherein the first or second flap further comprise an elongated opening configured to allow a handle bar of the utility vehicle to slide therethough.

10. The utility vehicle screen of claim 1, wherein the utility vehicle is comprised of one or more of: utility task vehicle (UTV), all terrain vehicle (ATV), recreational off highway vehicle (ROV), golf car, golf cart, motorcycle, and automobile.

11. A utility vehicle screen, comprising:
    a frame;
    a meshed flexible screen coupled to the frame;
    wherein the frame comprises a wraparound stretchable securement member extending along the side of the frame for enclosing a side pillar of a utility vehicle;
    wherein the securement member further comprises a fastener along its length, wherein the securement member is configured to couple to the frame via the fastener in assembled form, and wherein the assembled form is comprised of the securement member in a tubular configuration.

12. The utility vehicle screen of claim 11, wherein the screen is made of neoprene or polychloroprene material.

13. The utility vehicle screen of claim 11, wherein the fastener is comprised of interlocking male and female members.

14. The utility vehicle screen of claim 11, wherein the securement member further comprises indicia thereon.

15. A method of using a utility vehicle screen, comprising:
    placing a flexible frame having a meshed screen over a side pillar of a utility vehicle;
    wrapping an elastic end flap of the frame around the side pillar of the utility vehicle, thereby encasing at least 25% of the side pillar; and
    securing the flap to the frame using a closure unit extending along the length of the flap.

16. The method of claim 15, further comprising wrapping a second flap of the frame around a second side pillar of the utility vehicle and securing the second flap to the frame using a second closure unit extending along the length of the second flap.

* * * * *